United States Patent [19]

Hinterholzer et al.

[11] Patent Number: 5,189,152
[45] Date of Patent: Feb. 23, 1993

[54] CELLULOSE SOLUTION IN WATER AND NMMO

[75] Inventors: Peter Hinterholzer, Timelkam; Stefan Zikeli, Regau; Heinrich Firgo, Vöcklabruck; Bernd Wolschner, Vöcklabruck; Dieter Eichinger, Vöcklabruck; Johann Männer, Weyregg/Attersee; Stephan Astegger, Vöcklabruck; Karin Weinzierl, Timelkam, all of Austria

[73] Assignee: Lenzing Aktiengesellschaft, Lenzing, Austria

[21] Appl. No.: 730,169

[22] Filed: Jul. 16, 1991

[30] Foreign Application Priority Data

Jul. 16, 1990 [AT] Austria .................................. 1509/90

[51] Int. Cl.⁵ .......................... C08B 16/00; C08L 1/08; C08J 4/00
[52] U.S. Cl. .......................................... 536/56; 536/57; 106/168; 106/178; 106/198
[58] Field of Search ................... 536/56, 57; 106/168, 106/178, 198, 203

[56] References Cited

U.S. PATENT DOCUMENTS

| | | | |
|---|---|---|---|
| 4,196,282 | 4/1980 | Franks et al. | 536/57 |
| 4,246,221 | 1/1981 | McCorsley, III | 536/57 |
| 4,290,815 | 9/1981 | Henry | 106/186 |
| 4,426,228 | 1/1984 | Brandner et al. | 106/203 |
| 4,634,470 | 1/1987 | Kamide et al. | 536/56 |

*Primary Examiner*—Nathan M. Nutter
*Attorney, Agent, or Firm*—Herbert Dubno; Jonathan Myers

[57] ABSTRACT

A solution of cellulose in water and N-methylmorpholine-N-oxide (NMMO) containing 2 to 44% by weight cellulose is stabilized at 0.01 to 1%, preferably 0.1% $H_2O_2$ and 0.01 to 2%, preferably 0.1% of an $H_2O_2$ stabilizer, preferably oxalic acid or a salt thereof during formation of the solution and during heating to prevent discoloration of the cellulose and reduce the composition of NMMO.

12 Claims, No Drawings

CELLULOSE SOLUTION IN WATER AND NMMO

FIELD OF THE INVENTINO

Our present invention relates to a solution of cellulose in water and N-methylmorpholine-N-oxide (NMMO). The invention also relates to a method of limiting decomposition of N-methylmorpholine-N-oxide in such a cellulose solution.

BACKGROUND OF THE INVENTION

It is known, for example, from U.S. Pat. 4,196,282, to dissolve cellulose in N-methylmorpholine-N-oxide (NMMO) and water. Such cellulose solutions contain 2 to 44% by weight cellulose and can be used, for example, for production of cellulose fibers in the viscose process or for the fabrication of other shaped bodies with a cellulosic composition. For this purpose the solution can be extruded into a precipitating bath from spinning nozzles or orifices, e.g. from spinnerets. The use of a mixture of NMMO and water as the solvent phase has a variety of advantages, of which the most important is that it permits substantially complete recirculation of the solvent so that environmental challenge is greatly reduced or eliminated.

With such solutions, however, a problem can arise. During the dissolution of the cellulose and/or on warming of the system, amines such as N-methylmorpholine and morpholine can form by the decomposition of the NMMO.

The formation of these amines should be avoided because NMMO is extremely expensive and, to the extent that N-methylmorpholine and morpholine form, the process becomes uneconomical. To minimize the decomposition of the NMMO or to hold the decomposition within tolerable limits, stabilizers may be added to the solution. In the past, however, stabilizing efforts have lead to segmentation of the solution requiring bleaching of the cellulose product or cleaning of the NMMO before reuse of the latter is possible.

OBJECTS OF THE INVENTION

It is the principal object of the present invention to provide a solution of cellulose in water and NMMO whereby these drawbacks are avoided Still another object of the invention is to provide a method of limiting decomposition of NMMO and the formation of colored decomposition products which might interfere with the economy of the process or require subsequent bleaching of the cellulosic product or cleaning of the recycled NMMO prior to use.

DESCRIPTION OF THE INVENTION

We have found, most surprisingly, that these objects can be attained by the addition to the cellulose solution in water and N-methylmorphole-N-oxide (NMMO) containing 2 to 44% by weight cellulose of 0.01 to 1% of $H_2O_2$ and 0.01 to 2 % of a stabilizer for $H_2O_2$. In the following description, all percents are by weight unless otherwise indicated. Preferably the $H_2O_2$ is maintained in the solution at a concentration of 0.01% and the solution also contains 0.1 % of the stabilizer for $H_2O_2$ which is preferably oxalic acid or a salt thereof.

It appears that the $H_2O_2$ stabilizes the NMMO against decomposition by providing an oxidation medium capable of reversing the decomposition to N-methylmorpholine or reoxidizing the N-methylmorpholine as soon as it is produced to the NMMO.

When these conditions are maintained in the solution, practically no decomposition of the NMMO to N-methylmorpholine is observed.

Since, with the practice of the present invention, the cellulose is colored to a lesser degree, there is less need for bleaching of the cellulose product and there indeed may be some bleaching contributed by the $H_2O_2$ present in the solution. $H_2O_2$ is already recognized as a bleach in cellulose technology and in the processing of cotton where its bleaching affect is recognized as sharply pH dependent. Cellulosic NMMO/water solutions have a pH value of 12 to 13 at 90° C. For radical reactions low temperatures are preferred in the absence of transition metal ions. The latter condition can be achieved by the presence of bleach or $H_2O_2$ stabilizers. Thus the cellulose and NMMO solution is stabilized according to the invention the presence of $H_2O_2$ and the $H_2O_2$ is stabilized by the presence of a bleach stabilizer. The stabilization of the cellulose is important because decomposition of the cellulose can result in a deterioration of the product characteristics of the shaped cellulose bodies which can be formed from the solution.

Stabilizers for $H_2O_2$ in the solution can include glycine (amino acetic acid), phosphoric acid, polyacrylic acid, polyhydroxyacrylic acid, water glass, phosphoric acid and oxalic acid and salts thereof. Oxalic acid and its salts are preferred.

An advantage of the invention is that the decomposition of NMMO to N-methylmorpholine during formation of the solution and the heating thereof is reduced and, as a result, there is a corresponding reduction in the cost of recovery of NMMO and an increase in the economy of the overall process. A further advantage is the unusual reduction in the coloration of the solution to the point that a bleaching of the cellulose products made therefrom usually is no longer necessary so that the use of chlorine bleaches which could give rise to chlorinated hydrocarbons including dioxin, can be avoided. In cases in which more expensive $H_2O_2$ bleaches must be use, the bleaching cost can be reduced.

SPECIFIC EXAMPLES

Examples 1 and 2

Comparison of a solution with $H_2O_2$ with a solution without $H_2O_2$

In a stirred 5 liter vessel water is distilled off from a suspension of 2888 g of 80% aqueous NMMO solution, 300 g cellulose (Buckeye-V5 cellulose, 90% dry content), $H_2O_2$ and stabilizer (see Table 1). After 30 minutes 3000 g of a solution with the following composition is obtained:

9 % cellulose (Buckeye-V5)
14 % water
77 % NMMO

This solution is forced through a nozzle through an I5 air gap into a precipitating bath in which it is coagulated to form fibers.

In Example 1 (comparative test) the solution additionally contains oxalic acid as the stabilizer whereas in Example 2 (representing the invention), both oxalic acid and $H_2O_2$ are present. The quantities of stabilizer and $H_2O_2$ and the characteristics of the resulting fibers are found in Table 1.

TABLE 1

| EXAMPLE | $H_2O_2$ | OXALIC ACID | DEGREE OF BRIGHTNESS OF THE WASHED FIBERS | DP OF THE FIBERS | AMINE IN VAPORS |
| --- | --- | --- | --- | --- | --- |
| 1 | — | 0.5% | 64.5 | 610 | 0.12% |
| 2 | 0.1 | 0.1% | 68.3 | 560 | *) |

*) Concentration is so low that it could not be determined potentiometrically

It is possible to raise the TAPPI brightness while simultaneously maintaining the cellulose DP at the cost of stabilization of the NMMO.

Examples 3 to 12

Comparison of Different Stabilizers

We proceeded as in Examples 1 and 2. The stabilizers used, the amounts of $H_2O_2$ employed and the DP value of the cellulose produced are apparent from Table 2.

TABLE 2

| EXAMPLE | $H_2O_2$ | STABILIZER | DP OF COAGULATED CELLULOSE |
| --- | --- | --- | --- |
| 3 | 0.03% | 0.1% Polyacrylic acid | 460 |
| 4 | 0.06% | 0.1% Polyhydroxyacrylic acid | 490 |
| 5 | 0.4% | 0.5% Polyhydroxyacrylic acid | 520 |
| 6 | 0.2% | 2% Phosphoric acid | 390 |
| 7 | 0.5% | 0.5% Phthalic acid | 330 |
| 8 | 0.5% | 0.5% Benzoic acid | 250 |
| 9 | 0.5% | 0.5% Acetic acid | 200 |
| 10 | 0.1% | 0.1% EDTA | 520 |
| 11 | 0.1% | 0.1% Water Glass | 330 |
| 12 | 0.03% | 0.1% Phosphoric acid | 490 |

Bleach stabilizers and iron complex stabilizers are thus also effective in this system.

Examples 13 and 14

Comparison of a Solution Which Contains Rutin With One Which Contains $H_2O_2$ and Oxalic Acid The spinning composition was 18 kilograms of the following mixture:
10.0% Cellulose (Buckeye-V5)
789.0% NMMO (used, carbon-cleaned)
12.0% $H_2O$ In Example 13, 0.02 % rutin was added as stabilizer and in Example 14 the stabilizer was 0.1% $H_2O_2$ and 0.5% oxalic acid.

The test was carried out in a 40 liter reactor. To obtain a representative data cross section, each of several spinning tests was carried out in three cycles, i.e. the spinning bath recovered from the spinning operation (first cycle) is evaporated and the NMMO recovered in this manner is used for the cellulose dissolving process and for spinning (second cycle) the process is repeated (third cycle). The following data was obtained.
Increase in impurities
Corrosion behavior
Behavior of oxalic acid/$H_2O_2$ in the NMMO circulation
Crude fiber brightness
General fiber data
Decomposition temperature of the spinning mass The collected spinning bath from each cycle was concentrated by a thin film evaporator and utilized for the next cycle.

From Table 3 is will be apparent how th extinction factor of the NMMO increases during the individual cycles or how it drops after a carbon cleaning.

The table also shows the effect of contamination by Fe and the $H_2O_2$ and oxalic acid concentrations.

TABLE 3

| Stabilizer | NMMO | RUTIN* | | NMMO | Oxalic Acid/$H_2O_2$ | | | |
| --- | --- | --- | --- | --- | --- | --- | --- | --- |
| Cycle | Starting | 1 | 2 | End | 1 | 2 | 3 | 3.Carbon Cleaning |
| Extinction factor | 0.027 | 1.242 | 1.650 | 0.027 | 0.243 | 0.280 | 0.390 | 0.007 |
| Coloration compared to NMMO at Starting | | 46 times | 61 times | | 9 times | 10 times | 14 times | |
| % of $H_2O_2$ | | | | 0.076 | 0 | 0 | 0 | 0 |
| Oxalic Acid | | | | 0.38 | 0.33 | 0.38 | 0.33 | 0.33 |

*The spinning bath from the third Rutin cycle was not determined.

The results in Table 3 can be summarized as follows:
Increase in impurities.

In the case of the use of rutin it is 5 to 6 times higher than with the use of $H_2O_2$/oxalic acid.

Behavior of oxalic acid/$H_2O_2$ in NMMO circulation:

Rutin is partly decomposed as was also apparent from earlier tests and during spinning bath cleaning with carbon is completely eliminated from the NMMO.

With oxalic acid/$H_2O_2$, the $H_2O_2$ supplied is completely decomposed. The oxalic acid is only partly consumed in the NMMO circulation.

With spinning bath cleaning with active carbon the oxalic acid is not retained and thus can be reused as a stabilizer.

For the TAPPI fiber brightness, with rutin, brightnesses of 62; 59; and 59 were attained in the successive cycles while with oxalic acid/$H_2O_2$ the TAPPI brightness was 70; 70; and 71.

The fiber crude brightness in the case of rutin by TAPPI was approximately 62 or about 8 points lower than that obtained with oxalic acid/$H_2O_2$ having a TAPPI brightness of about 70.

The cycles with rutin drop the crude brightness by about 2 points while the cycles with oxalic acid/$H_2O_2$ raise the brightness by comparison to the crude brightness by about 2 points in successive cycles.

The fiber data DP; FFk; FDk; SF and SDk are in both tests at about the same level.

Examples 15 through 20

In an IKA-DUPLEX-Kneader 20 g of cellulose (Dry content 90 %) is dissolved in 182 g NMMO, 3 g oxalic acid salt (see Table 4) and 0.6 g $H_2O_2$ (30 % aqueous), at 90° C. for one hour. The complex viscosity was then measured with an angular speed of 4.3 (l/s) and 185 (l/s) using a HAAKE RV20 Rotary Viscosimeter in oscillation mode.

TABLE 4

| Example | Stabilizer | Complex Viscosity at 4.3 (l/s) | Complex Viscosity at 185 (l/s) |
|---------|------------|-------------------------------|--------------------------------|
| 15 | Ammonium oxalate | 762 | 37 |
| 16 | Lithium oxalate | 750 | 33 |
| 17 | Sodium oxalate | 703 | 32 |
| 18 | Magnesium oxalate | 530 | 27 |
| 19 | Oxalic acid | 768 | 34 |
| 20 | Rutin | 767 | 33 |

The solutions are not discolored on formation. Because they have essentially the same viscosities it can be concluded that the stabilizing effect of the oxalate/$H_2O_2$ compositions, with exception of magnesium oxalate, is essentially the same as that for oxalic acid/$H_2O_2$.

We claim:

1. A cellulose solution in water and N-methyl-morpholine-N-oxide which comprises 2 to 44% by weight cellulose and which further comprises 0.01 to 1% $H_2O_2$ and 0.01 to 2% of a stablizer for $H_2O_2$.

2. The solution defined in claim 1 wherein said stabilizer is oxalic acid or a salt thereof.

3. The solution defined in claim 1 wherein said $H_2O_2$ is present in an amount of about 0.1%.

4. The solution defined in claim 1 wherein said stabilizer is present in an amount of about 0.1%.

5. The solution defined in claim 4 wherein said stabilizer is oxalic acid or a salt thereof.

6. The solution defined in claim 5 wherein said $H_2O_2$ is present in an amount of about 0.1%.

7. A method of limiting decomposition of N-methyl-morpholine-N-oxide in a cellulose solution in water and N-methyl-morpholine-N-oxide, containing 2 to 44% by weight cellulose, which comprises maintaining in said solution a concentration of 0.01 to 1% $H_2O_2$ and 0.01 to 2% of a stabilizer for $H_2O_2$.

8. The method defined in claim 7 wherein said stabilizer is oxalic acid or a salt thereof.

9. The method defined in claim in claim 7 wherein said $H_2O_2$ is present in an amount of about 0.1%.

10. The method defined in claim 7 wherein said stabilizer is present in an amount of about 0.1%.

11. The method defined in claim 10 wherein said stabilizer is oxalic acid or a salt thereof.

12. The method defired in claim 11 wherein said $H_2O_2$ is present in an amount of about 0.1%.

* * * * *